Feb. 20, 1934. A. WARMISHAM ET AL 1,947,669
LENS OF VARIABLE EQUIVALENT FOCAL LENGTH
Filed Sept. 28, 1931 7 Sheets-Sheet 1
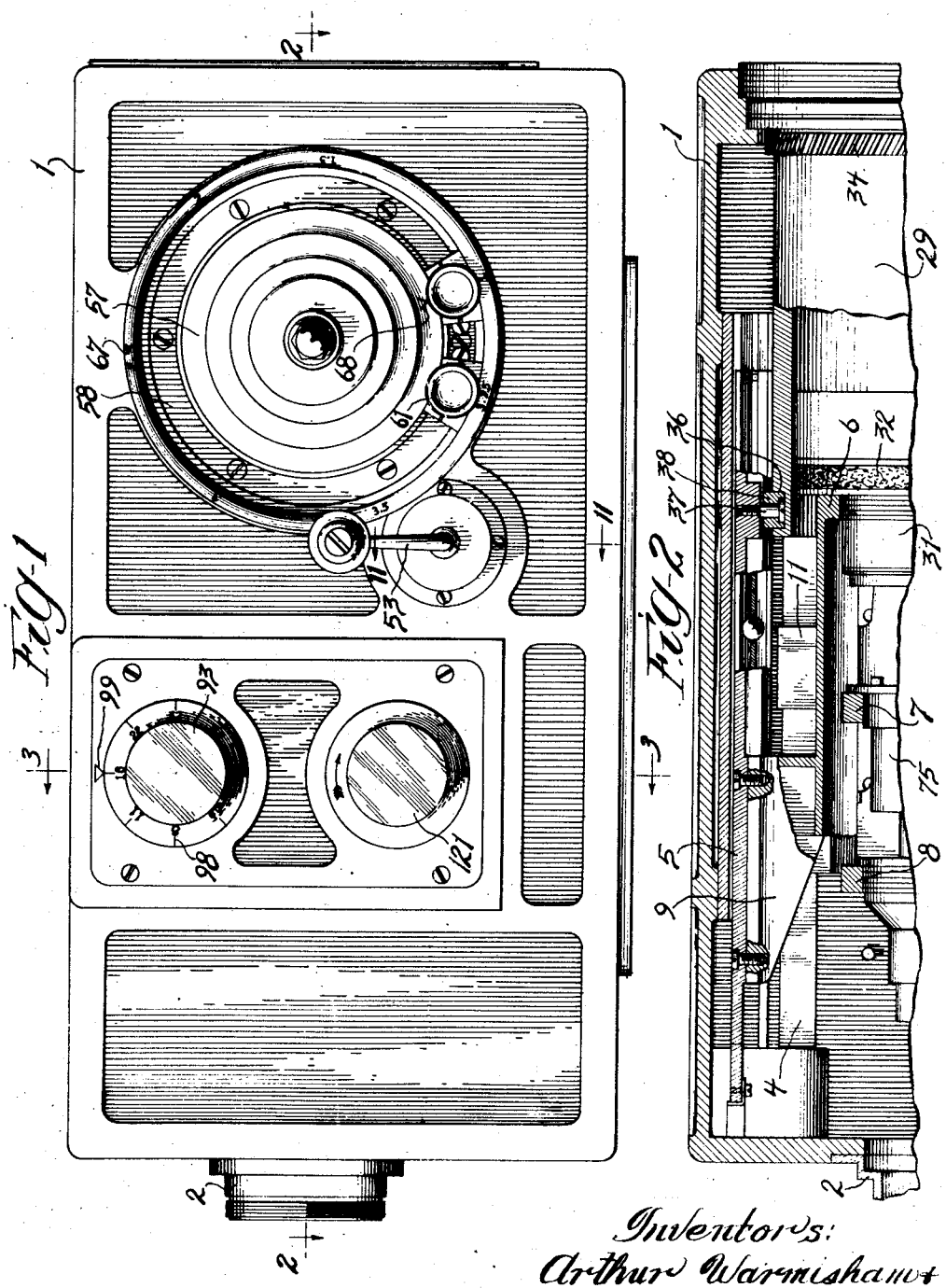

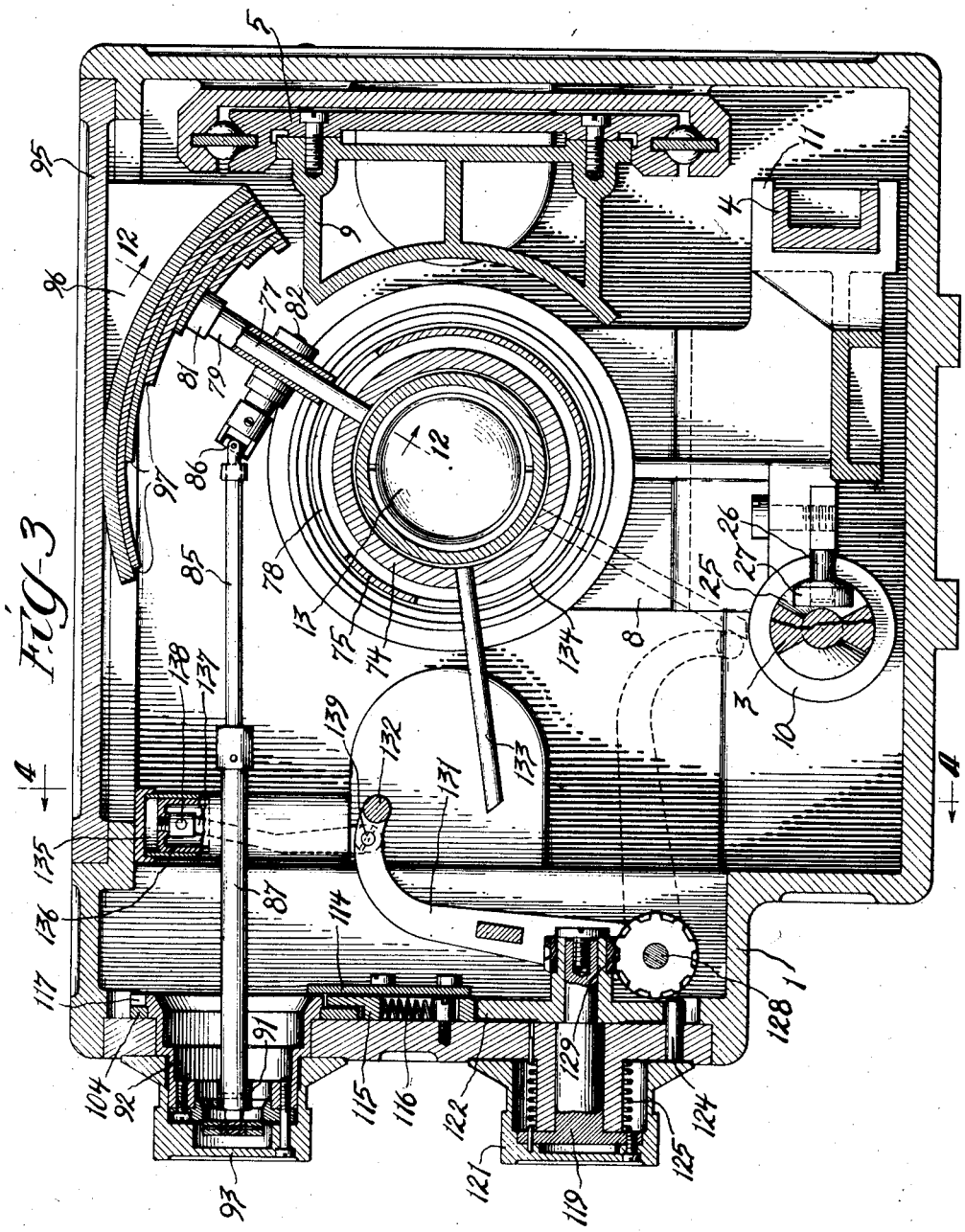

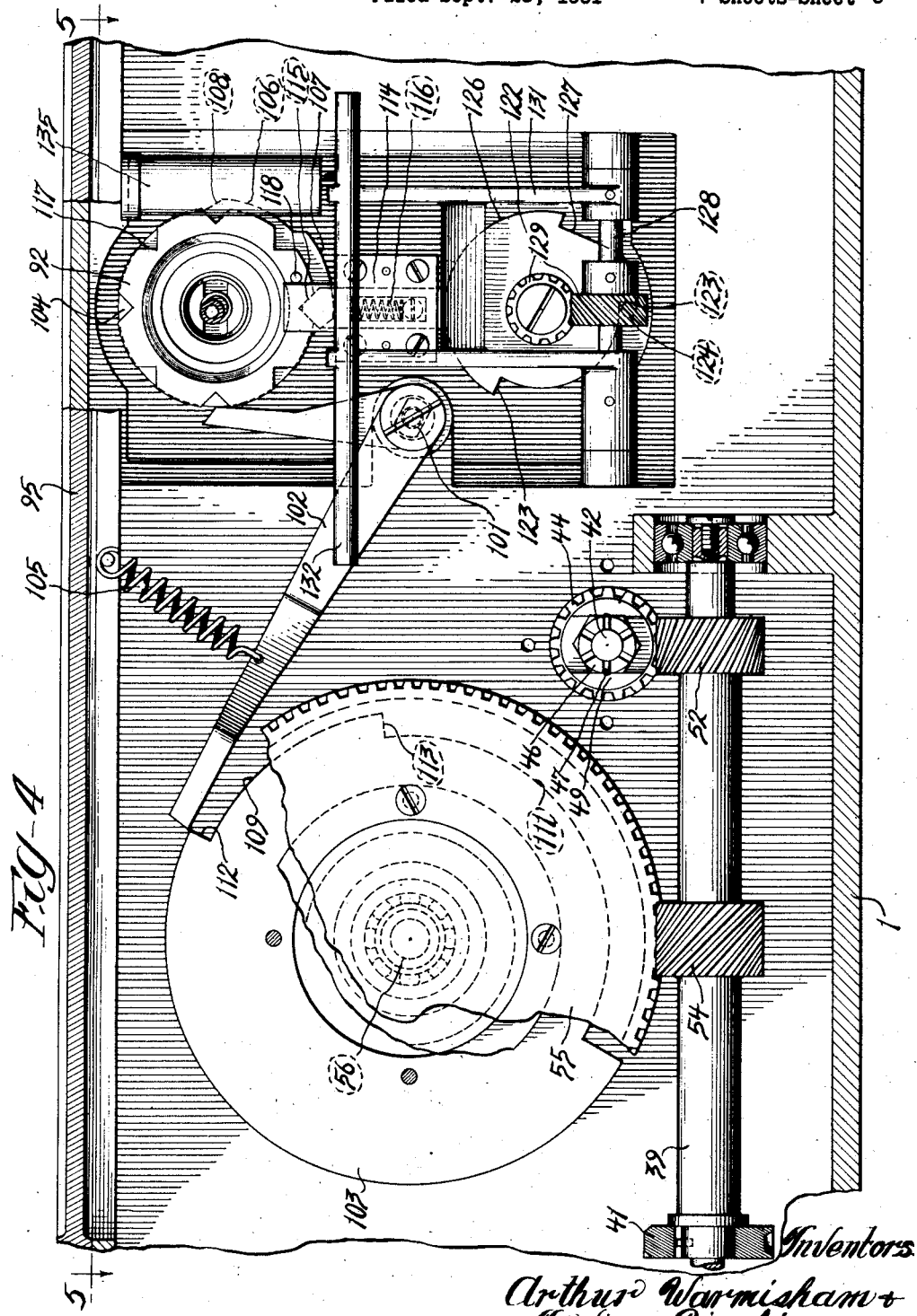

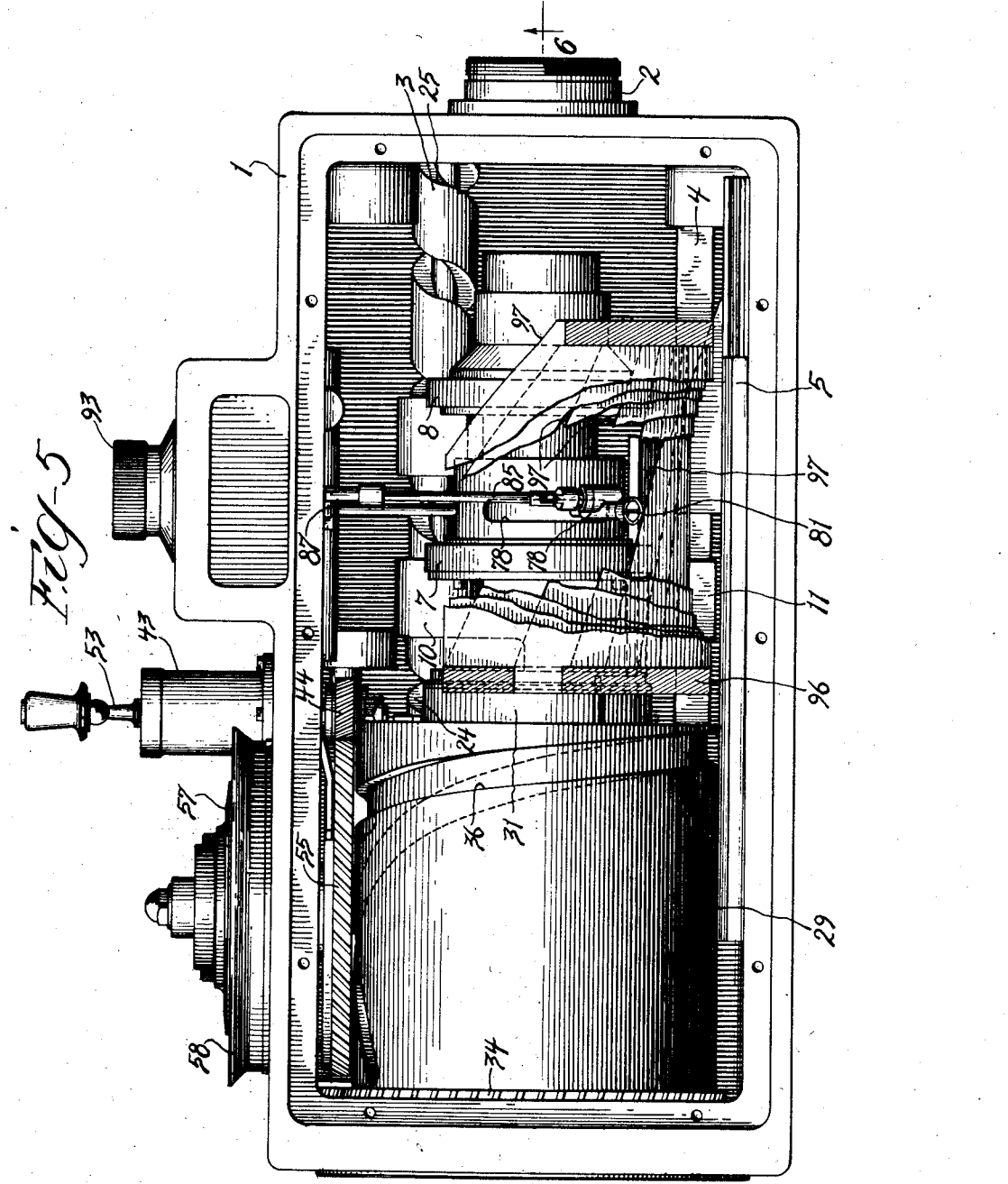

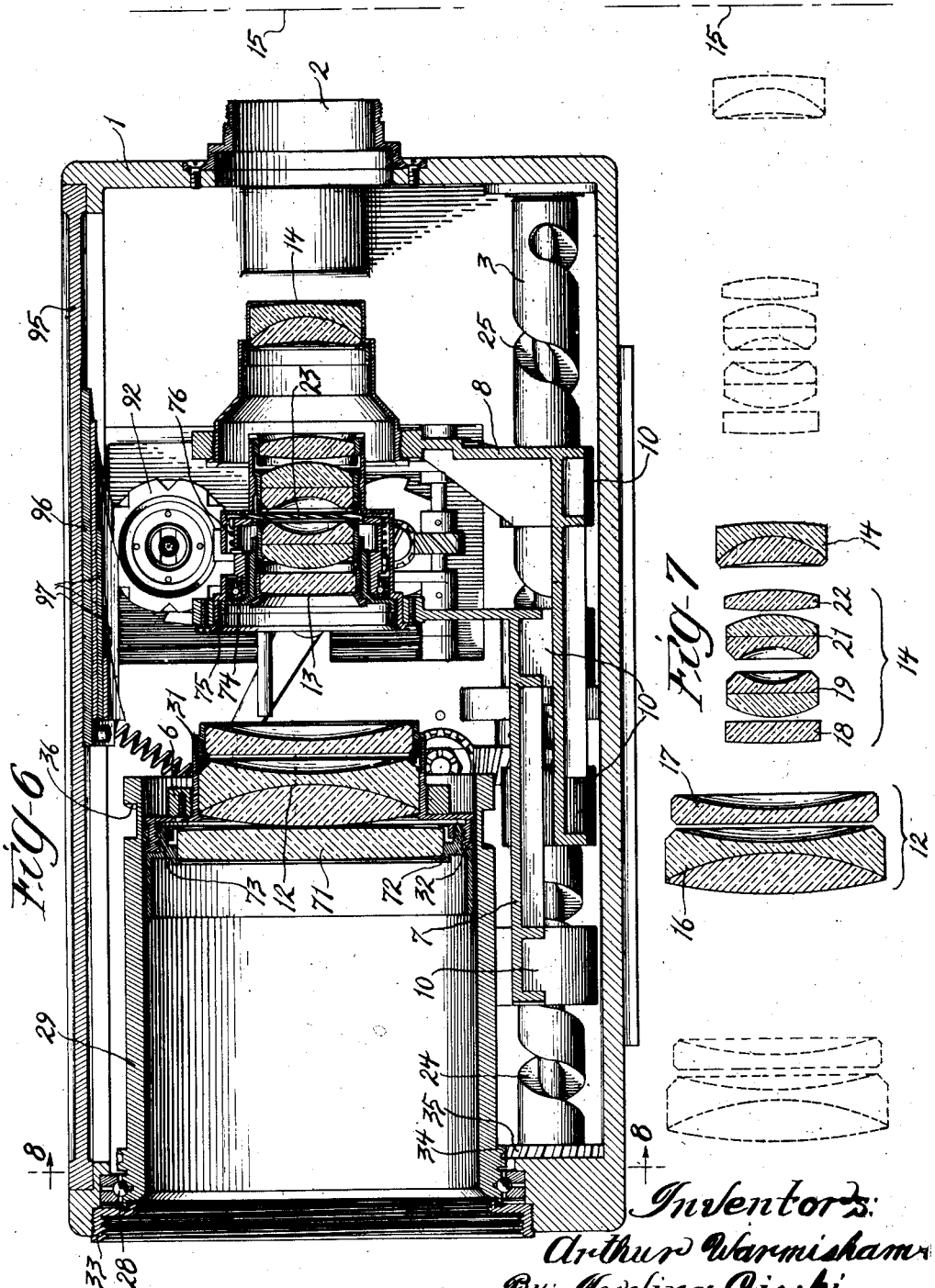

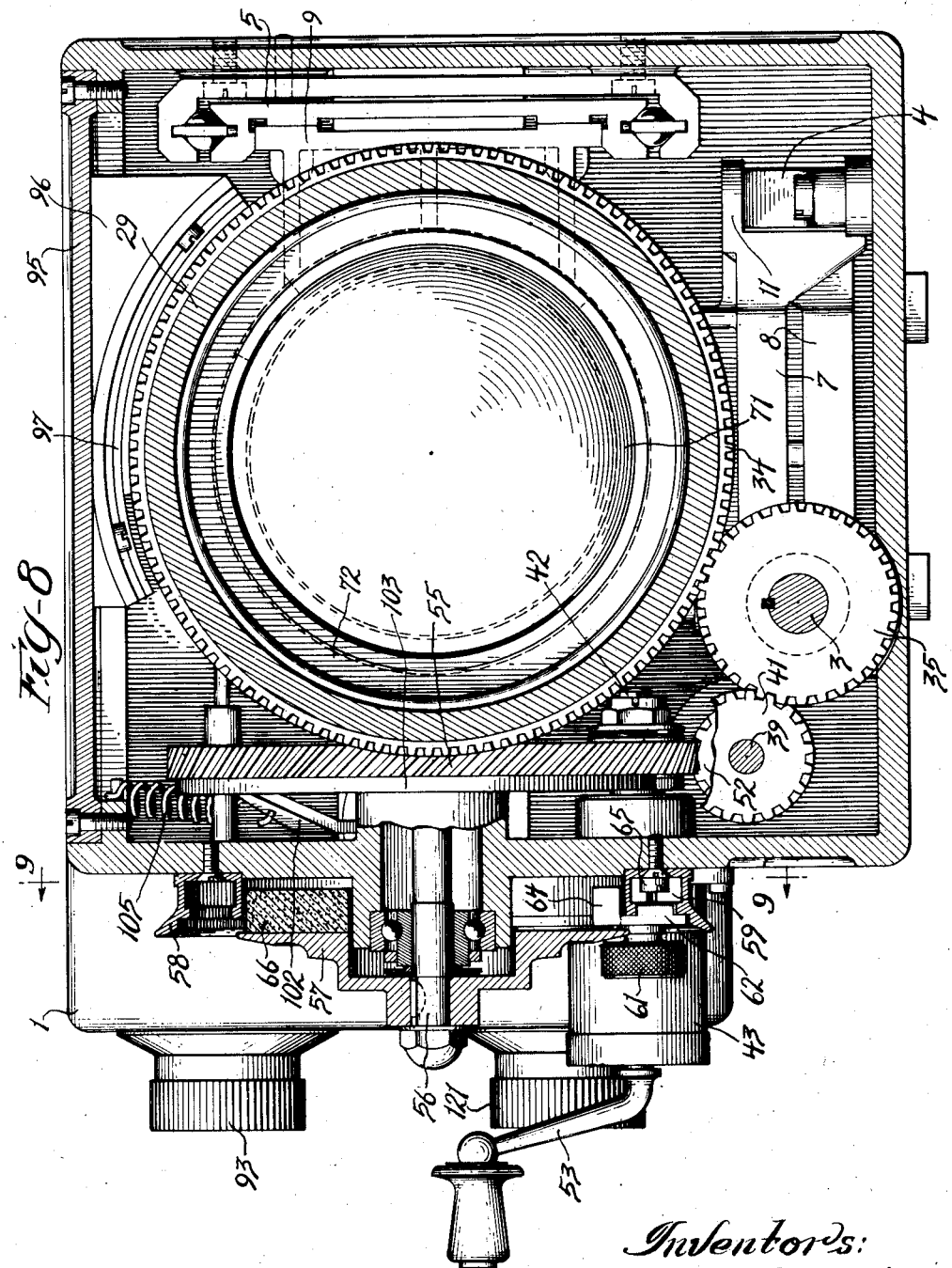

Feb. 20, 1934.    A. WARMISHAM ET AL    1,947,669
LENS OF VARIABLE EQUIVALENT FOCAL LENGTH
Filed Sept. 28, 1931    7 Sheets-Sheet 7
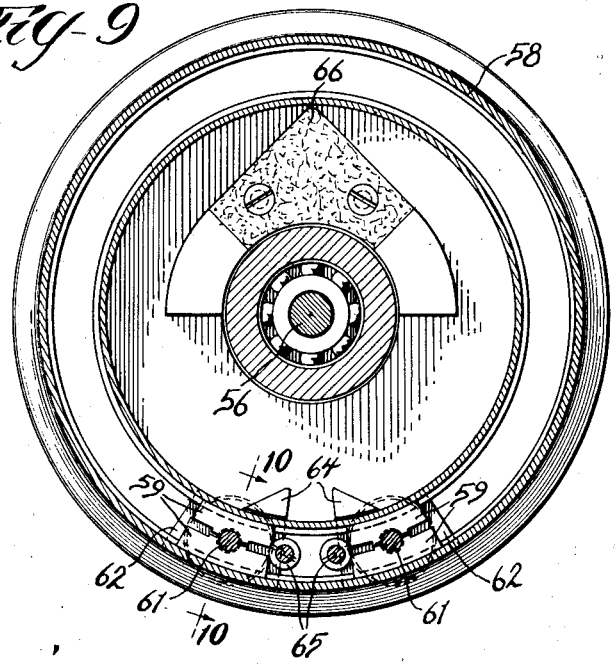
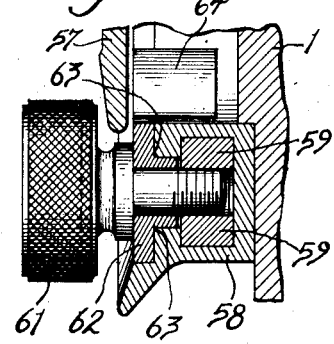
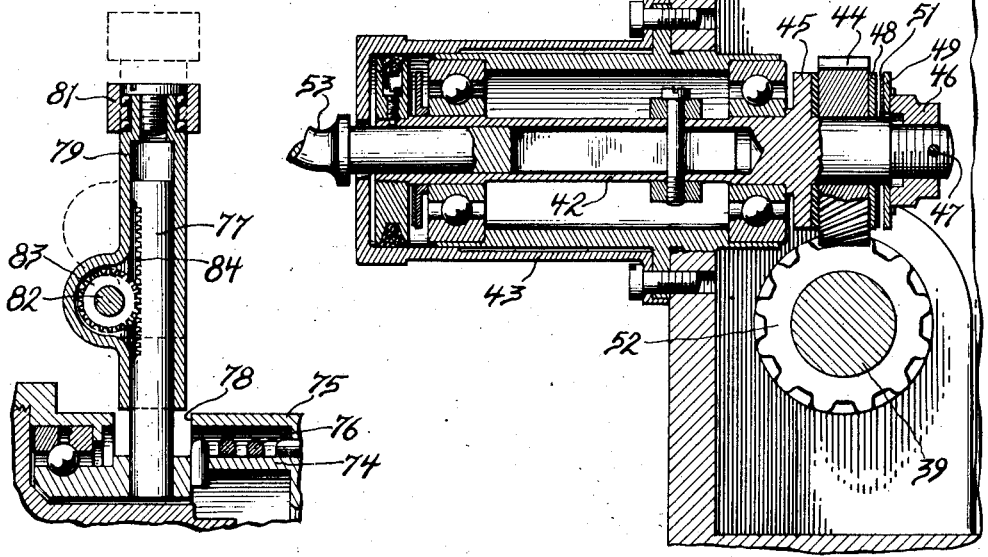
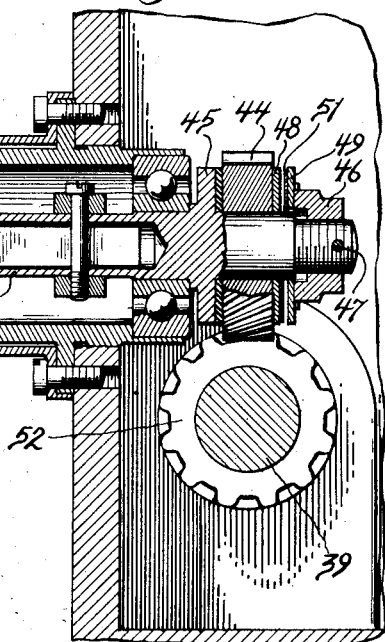
Inventors:
Arthur Warmisham +
By:- Irving Cisski.
Miehle & Miehle, Att'ys.

UNITED STATES PATENT OFFICE 1,947,669

LENS OF VARIABLE EQUIVALENT FOCAL LENGTH

Arthur Warmisham, Evanston, and Irving Cisski, Chicago, Ill., assignors to The Bell & Howell Company, Chicago, Ill., a corporation of Illinois Application September 28, 1931
Serial No. 565,516

24 Claims. (Cl. 95—45)

Our invention relates particularly to photographic objectives for use in motion picture photography for varying the size of images projected by an objective without changing the object distance, thus conveniently providing for the taking of relatively "long shots" and "close ups".

The main object of the invention resides in the provision of a lens of variable equivalent focal length in which the variation of the optical aberrations with variation of the equivalent focal length is quite reduced with the result that a relatively great variation of equivalent focal length is permissible, say in the order of 3¾ to 1, while permitting at the same time a relatively large relative aperture, say in the order of f/5.5 or larger.

With this object in view our invention consists in certain features of novelty in the construction, combination, and arrangement of parts by which the said objects and certain other objects, hereinafter appearing, are effected, all as fully described with reference to the accompanying drawings and more particularly pointed out in the appended claims.

In the said drawings—

Figure 1 is a side elevation of a photographic objective embodying my invention;

Figure 2 is a partial section on the line 2—2 of Figure 1;

Figure 3 is a sectional view on the line 3—3 of Figure 1;

Figure 4 is a partial sectional view on the line 4—4 of Figure 3 and with parts broken away;

Figure 5 is a plan view of the device with the cover thereof removed and showing certain structure, carried by the cover, in section, on the line 5—5 of Figure 4 and broken away;

Figure 6 is a sectional view on the line 6—6 of Figure 5;

Figure 7 is an axial section of the main lens members of the device showing their relative positions at one end of their adjustment, and also showing in broken lines their relative positions at the other end of their adjustment;

Figure 8 is a sectional view substantially on the line 8—8 of Figure 6;

Figure 9 is a partial sectional view substantially on the line 9—9 of Figure 8;

Figure 10 is a partial sectional view on the line 10—10 of Figure 9;

Figure 11 is a partial sectional view on the line 11—11 of Figure 1; and

Figure 12 is a partial sectional view on the line 12—12 of Figure 3.

Like characters of reference indicate like parts in the several views.

Referring to the drawings, 1 designates an elongated casing having a relatively large circular opening in the front wall thereof and having a relatively small central opening in the rear wall thereof, which is coaxial with the front opening and which is provided with a coaxial rearwardly projecting bushing 2 which is adapted to be engaged in a usual lens mount aperture of a photographic camera, not shown, the casing being carried with the camera in a manner unnecessary to be described. See Figures 1 and 6.

Arranged within the lower portion of the casing adjacent one side thereof is a forwardly and rearwardly extending revoluble shaft 3 which is parallel with the axis of the aforementioned casing openings and has its ends rotatably mounted in the end walls of the casing. See Figures 3, 5 and 8. Also arranged within the lower portion of the casing but adjacent the other side thereof is a forwardly and rearwardly extending way or slide bearing member 4 which is secured with the casing and arranged in parallelism with the shaft 3 and the axis of the aforementioned casing openings.

Also arranged within the casing and mounted on the side wall thereof adjacent the slide bearing member 4 is a linear antifriction bearing 5 which also extends forwardly and rearwardly in parallelism with the axis of the aforementioned casing openings. See Figures 2, 3 and 8.

Disposed within the casing are three lens carriers 6, 7 and 8, of which the front carrier 6 is provided with a rearwardly disposed lateral extension 9 which is secured with the movable member of the bearing 5, so that this carrier is mounted for movement along the axis of the aforementioned casing openings.

Each of the carriers 6 and 7 is provided at a downwardly disposed portion thereof with a pair of forwardly and rearwardly spaced bored lugs 10 which are engaged for sliding and relative angular movement on the shaft 3, and with a slotted bearing lug 11 slidably engaged on the slide bearing member 4, the forward lug 10 of the rear lens carrier 8 being disposed between the lugs 10 of the middle lens carrier 7, as will be seen in Figure 6, to provide an adequate length of bearing without sacrificing compactness.

Thus, the lens carriers 6, 7 and 8 are mounted for independent movement along the axis of the aforementioned casing openings.

The lens of variable equivalent focal length of our invention comprises a divergent front member 12 mounted on the front lens carrier 6, a convergent middle member 13 in back of the front member and mounted on the middle lens carrier 7, and a divergent back member 14 in back of the middle member and mounted on the rear lens carrier 8. See Figure 6. As so mounted the lens members 12, 13 and 14 are disposed on a common axis and that of the aforementioned casing openings, and are each axially adjustable with reference to the other lens members and with reference to a given focal plane, say the exposure plane of a film in a camera, not shown, but indicated at 15 in Figures 6 and 7.

It is by axial adjustment of the three lens members 12, 13 and 14 with reference to each other and with reference to a given focal plane that the varying equivalent focal length of the lens is obtained while maintaining the focal plane fixed, as will be hereinafter further described.

The optical advantage of the three member lens of our invention in reducing the variation of the optical aberrations with varying equivalent focal length is derived from a closer approach to optical symmetry as compared with the two member lenses of variable equivalent focal length heretofore proposed.

Apart from the question of variation of the optical aberrations, there is also the question of correcting them in an initial position without regard to alteration of position of the three lens members, and with a view toward satisfactory definition at a relatively large aperture, our three element lens system has been developed in the following manner.

Referring to Figures 6 and 7, the divergent front member 12 consists of two pieces 16 and 17 in order to improve the correction of coma, distortion, and astigmatism, and one of these pieces, as shown, the front piece 16, is compound to correct oblique color.

The convergent middle member 13 comprises four pieces 18, 19, 21 and 22, the two outer pieces 18 and 22 being simple convergent pieces, and the two inner ones 19 and 21 being compound divergent meniscus pieces. The back divergent member 14 comprises one compound piece.

Preferably, as shown, both pieces 16 and 17 of the front member 12 are divergent and one of them, the front piece 16 is meniscus shaped and both pieces have their concavities facing the middle member. The middle member 13 is of a four piece type, as previously described, and is preferably of approximately symmetrical form, and it is essential that on the whole the crowns should have lower refractive indexes than the flints. The back member 14 is preferably meniscus shaped, facing its concavity toward the intermediate member, and the cemented surface thereof is preferably very deep and convergent. By very deep we mean of the order of one half the minimum equivalent focal length of the whole combination.

A diaphragm 23 of usual construction is properly positioned inside the middle member 13 and is carried therewith, and the middle member being roughly symmetrical, the diaphragm operates midway of the middle air space of this member. See Figure 6.

The determination of the positions of the three members of the lens to give a required focal length is not unique per se, as there are two separations to be determined. When, however, the requirements of optical symmetry are applied, the determination becomes unique, so that a unique adjustment of the three members is determined for any given focal length, as is the case with a two member system.

Assuming that unique adjustments have been determined for different focal lengths, it is apparent that the displacement of the combination as a whole for different object distances varies with differences in focal length. That is to say, that, to compensate for change of object distance the combination has to be moved as a whole by an amount which depends not only on the change of object distance but also on the instantaneous equivalent focal length. Accordingly, the distances of the lens members of either system from a given focal plane are dependent upon the object distance.

We find it practical to maintain a fixed focal plane by giving any two of the three members of our system constant but different velocities of adjustment and giving the third member a varying velocity of adjustment. For example, if $d-1$, $d-2$, and $d-3$ are the distances from the fixed focal plane of front, middle, and back members respectively, the velocities of adjustment of the three members is determined by the following equations:

$$d-1 = \frac{a+bt+ct^2}{e+ft+gt^2}$$

$$d-2 = ht$$

$$d-3 = kt$$

in which $t$ represents the time counted from any arbitrary initial position of the three members, and $a, b, c, e, f, g, h, k$ are constants depending upon the focal lengths of the three members, the said initial position, and the object distance. The uniform rate of displacement of two of the members as described above is an obvious mechanical convenience, and it is to be observed that the invention is not restricted to the use of constant velocity for any of the members, the above velocities being those best adapted for the operation of the construction herein described. For a different range of equivalent focal lengths it might be more suitable to apply the varying velocity to either the middle or back member instead of to the front member.

Referring to Figure 7, the three members of our lens system are shown at their long focal length limit while they are also shown in broken lines in this figure at their short focal length limit, the line 15 constituting the fixed focal plane, say the film plane of a motion picture camera.

The three lens members are simultaneously operated throughout their range in accordance with the above formula in the following manner, for varying the equivalent focal length of the system while maintaining the focal plane thereof fixed.

As before stated the shaft 3 is rotatable, and formed forwardly on this shaft is a screw thread 24 of constant pitch and formed rearwardly on this shaft is a second screwthread 25 also of constant pitch, the pitch of the screwthread 24 being less than that of the screwthread 25.

The rear lug 10 of the carrier 8 is operatively connected with the screwthread 25 by means of an inwardly projecting radial stud 26 secured on this lug and a roller 27 rotatably mounted on this stud and engaging the screwthread 25, see Figure 3, and the front lug 10 of the carrier 7 is operatively connected similarly with the screwthread 24.

Consequently, rotation of the shaft 3 effects simultaneous adjustment of the carriers 7 and 8 and corresponding axial adjustment of the lens members 13 and 14 carried thereby at predetermined velocities proportional to the pitch of the screwthreads 24 and 25, these two lens members moving in the same direction at different velocities.

Rotatably mounted in the front opening of the casing by means of an antifriction bearing 28, is a tube 29 which is disposed coaxially with the lens system and projects rearwardly in the casing in surrounding relation with the front lens member 12, the forward end of the barrel 31 of this lens member being provided with a circular external light sealing structure 32 engaging outwardly against the internal surface of the tube 29 to prevent the ingress of light into the casing about the barrel 31 while permitting relative rotation and axial movement of the tube and barrel. See Figure 3.

An annular member 33 is screwthreaded into the front opening of the casing in front of the bearing 28 and prevents the passage of light through this bearing into the casing.

Formed on the tube 29 immediately to the rear of the bearing 28, is a gear 34 which meshes with a gear 35 secured on the shaft 3 adjacent its front end, see Figures 6 and 8, so that rotation of the shaft 3 and gear 35 effects angular movement of the tube 29.

Formed on the exterior of the tube 29 is a cam groove 36, see Figures 2 and 5, and a screw stud 37 mounted on the movable member of the bearing 5, to which the carrier 6 is attached, has a roller 38 rotatably mounted thereon, and this roller is engaged in the cam groove 36, so that angular movement of the tube 29 effects adjustment of the carrier 6 and corresponding axial adjustment of the front lens member 12 simultaneously with axial adjustment of the lens members 13 and 14.

The cam groove 36 is irregular in pitch, as will be seen in Figure 5, and thus constitutes the front lens member 12 as the heretofore mentioned third lens member having a varying velocity of adjustment, the middle and rear lens members moving in the same direction at different constant velocities while the front lens member reverses its direction of movement and moves at a varying velocity.

The adjustment of the lens system is effected from the exterior of the casing in the following manner.

Mounted for rotation within the casing is a forwardly and rearwardly extending shaft 39 upon the front end of which is secured a gear 41 which meshes with the gear 35. See Figures 4 and 8.

A transverse shaft 42 is mounted for rotation within a tubular fitting 43 extending through an opening in a side of the casing. See Figures 4, 8 and 11. A spiral gear 44 is rotatably mounted on this shaft adjacent its inner end, a friction faced enlargement 45 is formed on the shaft inwardly of the gear for frictional engagement with the adjacent face of the gear. A nut 46 is screwthreaded on the inner end of the shaft 42 and angularly secured therewith by a pin 47, and arranged on the shaft between the gear 44 and the nut 46 is a friction washer 48 engaging the corresponding side of the gear, a grooved washer 49 engaging against the nut and angularly fixed therewith, and a spring washer 51 between the washers 46 and 49 and serving to maintain frictional engagement between the gear 44 and the enlargement 45 and washer 48, thus providing a yieldable friction drive connection between the shaft 42 and the gear 44.

The gear 44 meshes with a spiral gear 52 secured on the shaft 39 whereby the lens system is adjusted by rotation of the shaft 42. A hand crank 53 is detachably secured with the shaft 42 for the convenient manual adjustment of the lens system, the frictional drive connection between this shaft and the gear 44 serving to prevent the mechanism from being strained when the lens system is stopped at the ends of its adjustment. A friction device 54 is associated with the outer end of the shaft 42 and provides a desirable drag thereon.

The shaft 39 is provided with an additional spiral gear 54 at the intermediate portion thereon, and this gear meshes with a large spiral gear 55 secured on the inner end of an additional shaft 56 rotatably mounted in an extended bore through the adjacent side of the casing. See Figures 4 and 8.

Secured on the outer end of the shaft 56 exteriorly of the casing, is a disk member 57, and secured on the exterior of the casing is an annular undercut channel member 58 arranged coaxially with the disk member and arranged immediately outward of the periphery thereof. See Figures 1, 8 and 9.

Mounted for adjustment on the channel member are two stop devices, each of which consists as follows. See Figures 1, 8, 9 and 10. A pair of slide block members 59 are engaged with opposite sides of the undercut portion of the channel of the channel member, and a hand screw 61 passes through a bore in a stop member 62 and is screwthreaded into a screwthreaded bore formed partially by each of the members 59, thus retaining the block members in the proper relation, the construction permitting of the assembly of the members within the undercut portion of the channel member. The stop member 62 is shouldered, as designated at 63, to engage in the reduced outer portion of the channel of the channel member for maintaining the stop member against rotation on the screw 61, and is provided with a stop portion 64 extending within the channel member and underneath the disk member 57.

Accordingly, the stop devices just described are adjustable about the channel member while the hand screws 61 are loose and are secured in adjusted positions by tightening the hand screws, and headed screws 65 have their heads disposed in the channel of the channel member to provide stops for the stop devices at the lower portion of the channel member.

The disk member 57 is provided on its inner face with a cushion stop structure 66 in the path of which lie the stop portions 64, see Figures 8, 9 and 10, so that adjustment of the stop devices determines the range and extent of angular movement of the disk member, and the disk member being operatively connected with the members of the lens system in their relative adjustment, adjustment of these stop devices determines the range and extent of adjustment of the lens system.

The outer face of the outer portion of the channel member 58 is indexed in terms of relative magnification, as shown at 67 in Figure 1, for facilitating desired adjustments of the stop devices, and the disk member 57 is provided with an index mark 68 for determining the instant adjustment of the lens system.

As hereinbefore stated, the adjustment velocities of the lens members of a variable equivalent focus lens system are dependent upon the object distance.

We propose to provide for different object distances in the following manner. The adjustment velocities of the lens members are determined for an arbitrary object distance, say 50 feet, and a supplementary lens 71, see Figure 6, is provided so that it projects a virtual image of another object distance to the arbitrary object distance, it being understood that a suitable number of different supplementary lenses be used interchangeably for accommodating different object distances other than the aforesaid arbitrary object distance.

The lens 71, as shown, is a weak convergent lens and as such projects a virtual image of a lesser object distance, say 20 feet, to the farther distant arbitrary object distance, say 50 feet, and is interchangeably mounted immediately in front of the lens member 12 by means of the carrier 72 of the lens 71 being screwthreaded rearwardly into the front lens barrel 31, as designated at 73.

The diaphragm 23 is controlled in the following manner.

The operating member of the diaphragm is in the form of a cylindrical member 74 within the barrel 75 of the middle member of the lens system and angularly movable with reference thereto for adjusting the diaphragm, and a torsion spring 76, surrounding the member 74 and having one end connected therewith and the other with the barrel 75, yieldably urges the diaphragm into the position of its smallest aperture. See Figure 6. A relatively long stud 77, mounted on the member 74, projects outwardly through an angular slot 78 in the lens barrel 75, and has a bored carrier 79 slidably mounted thereon, the carrier having a roller 81 rotatably mounted on its outer end. See Figures 3, 5 and 12.

Rotatably mounted on the carrier 79 on an axis transverse to that of the stud 77 is a short shaft 82 on which a gear 83 is secured, and this gear meshes with a rack 84 formed on the stud 77, whereby angular movement of the shaft 82 effects adjustment of the carrier 79 and its roller 81 along the stud 77.

A shaft 85 has one end thereof operatively connected with the shaft 82 by means of a universal joint 86. See Figure 3. A tubular shaft 87 is slidably engaged on the shaft 85 and angularly fixed therewith in a usual manner, and has the outer end thereof operatively connected, by a universal joint 91, with a shouldered bushing 92 mounted for angular movement in a bore through a side of the casing, a knob dial 93, arranged on the outside of the casing, being secured with the bushing.

Accordingly, angular adjustment of the knob dial 93 effects movement of the carrier 79 and its roller 81 along the stud 77, the universal joints 86 and 91 and the sliding engagement of the shaft 85 with reference to the shaft 87 permitting angular movement of the carrier with the member 74 and movement thereof along the stud 77.

The top of the casing 1 is formed by a removable cover 95, and secured on the underside of this cover, is a concave arcuate support formation 96 having its axis coincident with that of the lens system. See Figures 3 and 5. Carried with this formation, are a plurality of cam members 97, one of which is formed by the formation 96, which are arranged in stepped formation and extend longitudinally of the axis of the lens system.

The roller 81 is selectively engageable with each of the cam members 97 by adjustment of the carrier 79 along the stud 77, effected by means of the knob dial 93, the spring 76 holding the roller against the selected cam member.

During adjustment of the lens system for varying the equivalent focal length thereof, as heretofore described, the diaphragm 23 moves with the middle lens members. Consequently, the roller 81 traverses the cam member 97 with which it is engaged. Each cam member is so formed that it adjusts the diaphragm, during variation of the focal length of the lens system, to maintain the equivalent selected aperture throughout the adjustment of the lens system, the aperture being decreased as the lens system is adjusted toward its short focal length limit.

The cam members 97 are differently pitched, as will be observed in Figure 5, so that the automatic equivalent adjustment of the diaphragm is at different velocities dependent upon the selected diaphragm opening. This individual automatic equivalent adjustment for each selected adjustment permits of accuracy in maintaining a uniform exposure at all selected adjustments of the diaphragm.

The knob dial 93 is provided with an angularly arranged index scale 98 of standard diaphragm aperture openings, which scale cooperates with an index mark 99 on the casing to predeterminately indicate the different diaphragm adjustments, it being understood that each cam member 97 corresponds with one of the opening designations of the scale, and that the roller 81 is positioned to engage the corresponding cam member when a designation of the scale is opposite the index mark 99.

The lens system, as shown, does not permit of a relative aperture greater than f/5.5 through its range of variation of equivalent focal length, and in order to limit adjustment of the system at its long focal length limit at larger aperture adjustments of the diaphragm, the following is provided. See Figure 4.

Pivotally mounted, as designated at 101, on the side of the casing on which the shaft 56 and bushing 92 are carried, is a bell crank lever 102, one end of which extends forwardly to engage a stop disk 103 secured on the gear 55 and the other end of which extends upwardly to engage a ring 104 secured on the bushing 92. A tension spring 105, having one end connected with the lever 102 and the other end connected with the casing, yieldably urges the lever in a direction out of engagement with the stop disk 103 and into engagement with the ring 104.

The periphery of the ring 104, which is engaged by one end of the lever 102, is in the form of a stepped cam, the main or inner dwell portion of which permits the lever 102 to be positioned by the spring 105 so that the corresponding end of the lever clears the disk 103, while an intermediate dwell portion 106 and an outer dwell portion 107 of the cam progressively position the lever nearer to the axis of the disk, the several dwell portions being separated by relatively abrupt active portions 108.

The periphery of the disk, which is engaged by the other end of the lever 103 is progressively stepped inward from the maximum radius thereof, thus providing an intermediate step 109 and an inner step 111, the portion of maximum radius and the step 109 being separated by a radial shoulder 112 and the steps 109 and 111 being separated by a radial shoulder 113.

The arrangement is such that when the one end of the lever 102 is engaged with the inner dwell portion of the ring 104, as shown, the other end of the lever clears the disk 103, so that the lens system may be operated throughout its entire range of adjustment. When the one end of the lever 102 is engaged with the intermediate dwell portion 106 of the ring 104, the other end of the lever is lowered to engage the shoulder 112 to limit adjustment of the lens system at its long focal length limit. When the one end of the lever 102 is engaged with the outer dwell portion 107 of the ring 104, the other end of the lever is lowered to engage the shoulder 113 to further limit adjustment of the lens system at its long focal length limit.

The positioning of the ring 104 on the bushing 92 is such, that throughout the range of adjustment of the diaphragm smaller than f/4, the inner dwell portion of the ring 104 is engaged by the one end of the lever 102, thus permitting adjustment of the lens system throughout its entire range. When the diaphragm is positioned at f/4, the intermediate dwell portion 106 of the ring 104 is engaged by the one end of the lever 102, thus limiting the range of adjustment of the lens system for the f/4 aperture. When the diaphragm is positioned at f/3.5, the outer dwell portion 107 of the ring 104 is engaged by the one end of the lever 102, thus further limiting the range of adjustment of the lens system for the f/3.5 aperture.

The abruptness of the active cam portions 108 of the ring 104 engaging the corresponding end of the lever 102, provide stops preventing angular movement of the bushing 92 into the f/4 or f/3.5 position thereof when the disk 103 is not properly positioned angularly, it being contemplated that the lens system be positioned in a relatively short focal length position before the diaphragm is adjusted to f/4 or f/3.5.

Mounted for vertical sliding movement in a mounting 114 below the inner end of the bushing 92 is a latch member 115 which is yieldably urged upwardly against the periphery of the inner end of the bushing by a spring 116. See Figures 3 and 4. The periphery of the inner end of the bushing 92 is provided with angularly spaced notches 117 into which the latch member 115 engages for definitely locating the bushing at the diaphragm adjustments designated on the index 98 of the knob dial 93, the notches having an angle engagement with the latch member, so that the latch member disengages from the notches when the knob dial is turned with sufficient force.

The inner face of the bushing 92 is provided with a stop pin 118, see Figure 4, which engages the mounting 114 to prevent the bushing being rotated more than one revolution.

In order to prevent actuation of the dial knob dial 93 to adjust the diaphragm except when the diaphragm is positioned at its greatest aperture, so that the roller 81 cannot be moved outwardly against any of the cam members 97, the following is provided. See Figures 3 and 4.

A transverse shaft 119 is rotatably mounted in an extended bore through the side of the casing and below the bushing 92, and secured with this shaft on the outside of the casing is a dial knob 121 by means of which the shaft is manually actuated.

Secured on the inner end of the shaft 119 is a lock disk 122 provided with a reduced peripheral portion providing opposing shoulders 123, and a stop pin 124, mounted on the casing, is engageable by these shoulders to limit angular movement of the disk in both directions. A helical torsion spring 125 surrounds the shaft 119 and the extended bore portion of the casing and has one end connected with this shaft and the other end with the casing for actuating the shaft in one direction, which movement of the shaft is limited by engagement of the pin 124 with the corresponding shoulder 123, as shown.

In this position of the shaft 119 and disk 122, a portion 126 of the disk, having a relatively great radius, underlies the lower end of the latch member 115 to prevent its disengagement with a notch 117, thus preventing adjustment of the diaphragm. Manual actuation of the disk 122 from the aforementioned or normal position thereof brings a reduced or release peripheral portion 127 of the disk opposite the lower end of the latch member 115, so that the bushing 92 may be actuated to adjust the diaphragm.

Mounted for angular movement on and within the casing below the inner end of the shaft 119 is a shaft 128 which is actuated from the shaft 119 by a pair of meshing spiral angle gears 129. Secured on the shaft 128, is a double arm 131 having a continuous forwardly and rearwardly extending free end 132. A relatively long stud 133 is mounted on the diaphragm adjusting member 74 and projects outwardly through an angular slot 134 in the lens barrel 75 for engagement by the free end 132 with downward movement of the arm 131 to move the diaphragm to its widest aperture position, as indicated by broken lines in Figure 3.

The arrangement is such that actuation of the disk 122 out of its normal position, as aforementioned, releases the latch member 115 for actuation of the dial knob 93 to select an adjustment of the diaphragm and at the same time effects downward movement of the arm 131 to effect movement of the diaphragm to its largest aperture position in which the carrier 79 and its roller may be adjusted without interference from the cam members 97.

After the diaphragm adjustment is selected, the disk 122 is released to return to its normal position under the influence of the spring 125, this movement of the disk effecting movement of the arm 131 to its upper position with consequent movement of the diaphragm into the selected aperture adjustment by engagement of the roller 81 with the corresponding cam member 97, the sliding engagement of the shaft 85 and the shaft 87 and the universal joints 86 and 91 permitting angular, radial and forward and rearward movement of the carrier 79.

Secured upwardly on and arranged within the casing, is a vertically disposed downwardly facing compression cylinder 135 within which a piston 136 is engaged for sliding movement. See Figures 3 and 4. A connecting rod 137 has one end pivotally connected with this piston, as designated at 138, and has its other end pivotally connected with the arm 131 adjacent its free end, as designated at 139.

The compression of air in the cylinder 135 above the piston 136 serves to cushion upward movement of the arm 131 and corresponding movement of the shaft 119 under the influence of the spring 125, and in addition serves to cushion the movement of the diaphragm mechanism under the influence of the spring 76, so that the roller 81 is not brought into contact with a selected cam member 97 with undue force, the leakage of the compressed air about the piston permitting a desirable relatively slow movement of the diaphragm and control mechanism thereof under the influence of the springs 125 and 76.

Following is the optical data of the lens system comprising the members 12, 13 and 14, the dimensions being given in inches.

|  |  | Thickness | Air space | N. D. | V. |
|---|---|---|---|---|---|
| Front member 12 | I + 5.9066 / − 2.7250 | .480 |  | 1.6206 | 36.3 |
|  | II − 2.7250 / + 4.1841 | .120 |  | 1.6210 | 56.9 |
|  | III ∞ / + 3.8610 | .162 | .220 | 1.6252 | 56.3 |
| Middle member 13 | IV + 1.6878 / +18.7265 | .254 |  | 1.5726 | 57.3 |
|  | V + 1.0482 / ∞ | .273 | .038 | 1.5108 | 64.3 |
|  | VI ∞ / + .74517 | .115 |  | 1.5791 | 41.4 |
|  | VII − .84746 / ∞ | .115 | .410 | 1.5791 | 41.4 |
|  | VIII ∞ / − 1.0593 | .273 |  | 1.5108 | 64.3 |
|  | IX + 4.0816 / − 1.9701 | .254 | .038 | 1.5108 | 64.3 |
| Back member 14 | X − 2.6316 / − .8625 | .270 |  | 1.6940 | 30.7 |
|  | XI − .8625 / − 8.3034 | .150 |  | 1.6210 | 36.3 |

In these dimensions, a plus sign means convex toward the incident light while a minus sign means concave toward the incident light.

| Axial air spaces | Short focal length limit | Long focal length limit |
|---|---|---|
| Front-middle | 6.575 | .60 |
| Middle-back | 1.832 | .31 |
| Back-image plane | .710 | 5.66 |
| E. F. L | 1.61 | 5.78 |

While we have described and shown the preferred embodiment of our invention we do not wish to be limited to the precise details of construction as changes may readily be made without departing from the spirit of our invention, but having thus described our invention, we claim as new and desire to secure by Letters Patent the following:

1. In a lens of variable equivalent focal length the combination with a convergent middle member, of front and rear divergent members, and means whereby said members are relatively adjustable axially.

2. In a lens of variable equivalent focal length the combination with a convergent middle member, of front and rear divergent members, and means whereby said members are axially adjustable with reference to each other and a given focal plane.

3. In a lens of variable equivalent focal length the combination with an approximately symmetrical plural piece convergent middle member, of a two piece divergent front member one of the pieces of which is compound, and a divergent back member, and means whereby said members are relatively adjustable axially.

4. In a lens of variable equivalent focal length the combination with an approximately symmetrical plural piece convergent middle member, of a two piece divergent front member both pieces of which have their concavities facing said middle member and the front piece of which is compound and of meniscus shape, a divergent back member comprising a single compound piece, and means whereby said members are axially adjustable with reference to each other and a given focal plane.

5. In a lens of variable equivalent focal length the combination with an approximately symmetrical plural piece convergent middle member, of a two piece divergent front member both pieces of which have their concavities facing said middle member and the front piece of which is compound and of meniscus shape, a divergent back member comprising a single compound piece of meniscus shape with its concavity facing said middle member and having its cemented surface deeply curved and convergent, and means whereby said members are axially adjustable with reference to each other and a given focal plane.

6. In a device of the character described the combination with a lens of variable equivalent focal length comprising a middle convergent member and divergent front and back members, of means for simultaneously adjusting said members axially each at an individual predetermined velocity for varying the equivalent focal length of the lens while maintaining the focal plane thereof fixed.

7. In a device of the character described the combination with a lens of variable equivalent focal length comprising a middle convergent member and divergent front and back members, of means for simultaneously adjusting said members axially each at a different predetermined velocity for varying the equivalent focal length of the lens while maintaining the focal plane thereof fixed, the adjustment of at least one of said members being at a varying velocity.

8. In a device of the character described the combination with a lens of variable equivalent focal length comprising a middle convergent member and divergent front and back members, of means for simultaneously adjusting said members axially each at a different predetermined velocity for varying the equivalent focal length of the lens while maintaining the focal plane thereof fixed, the adjustment of the middle and back members being at different constant velocities in the same direction and the adjustment of the front member being at a varying velocity and reversing in direction.

9. In a device of the character described the combination with a lens of variable equivalent focal length comprising a plurality of members, of means for simultaneously adjusting said members axially each at an individual predetermined velocity for varying the equivalent focal length of the lens while maintaining the focal plane thereof fixed, said adjustment velocities of said members being determined for a given object distance.

10. In a device of the character described the combination with a lens of variable focal length comprising a plurality of members, of means for simultaneously adjusting said members axially each at a different predetermined velocity for varying the equivalent focal length of the lens while maintaining the focal plane thereof fixed, said adjustment velocities of said members being determined for a given object distance, and a selectively functioning supplementary lens for projecting a virtual image of another object distance to said given object distance.

11. In a device of the character described the combination with a lens of variable equivalent focal length comprising a middle convergent member and divergent front and back members, of means for simultaneously adjusting said members axially each at a different predetermined velocity for varying the equivalent focal length of the lens while maintaining the focal plane thereof fixed, said adjustment velocities of said members being determined for a given object distance.

12. In a device of the character described the combination with a lens of variable equivalent focal length comprising a middle convergent member and divergent front and back members, of means for simultaneously adjusting said members axially each at a different predetermined velocity for varying the equivalent focal length of the lens while maintaining the focal plane thereof fixed, said adjustment velocities of said members being determined for a given object distance, and a supplementary lens interchangeably carried with said front member in front of the same for projecting a virtual image of another object distance to said given object distance.

13. In a device of the character described the combination with a lens of variable equivalent focal length comprising a plurality of members, of means for simultaneously adjusting said members axially each at a different predetermined velocity for varying the equivalent focal length of the lens while maintaining the focal plane thereof fixed, an adjustable diaphragm associated with said lens, means for selectively adjusting said diaphragm, and means for automatically adjusting said diaphragm equivalently, with adjustment of said lens members, at different predetermined velocities dependent upon the selected adjustment of the diaphragm.

14. In a device of the character described the combination with a lens of variable equivalent focal length comprising a plurality of members, of means for simultaneously adjusting said members axially each a different predetermined velocity for varying the equivalent focal length of the lens while maintaining the focal plane thereof fixed, an adjustable diaphragm carried with one of said members, and a plurality of adjustment devices normally inoperative and adapted to be selectively associated operatively with said diaphragm for selectively adjusting the same and each adapted for automatically adjusting equivalently said diaphragm at an individual velocity with adjustment of said lens members.

15. In a device of the character described the combination with a lens of variable equivalent focal length comprising a plurality of members, of means for simultaneously adjusting said members axially each at a different predetermined velocity for varying the equivalent focal length of said lens while maintaining the focal plane thereof fixed, an adjustable diaphragm carried with one of said members, a plurality of cam members normally inoperative and adapted to be selectively associated operatively with said diaphragm for selectively adjusting the same and each adapted for automatically adjusting equivalently said diaphragm at an individual velocity with adjustment of said lens members, and a manually controlled device for selectively associating operatively said cam members with said diaphragm.

16. In a device of the character described the combination with a lens of variable equivalent focal length comprising a plurality of members, of means for simultaneously adjusting said members axially each at a different predetermined velocity for varying the equivalent focal length of the lens while maintaining the focal plane thereof fixed, an adjustable diaphragm carried with one of said members and yieldably urged to one end of its adjustment, a plurality of cam members normally inoperative and adapted to be selectively associated operatively with said diaphragm for selectively adjusting the same toward the other end of its adjustment and each adapted for automatically adjusting equivalently said diaphragm at an individual velocity with adjustment of said lens members, and a manually controlled device for selectively associating operatively said cam members with said diaphragm.

17. In a device of the character described the combination with a lens of variable equivalent focal length comprising a plurality of members, of means for simultaneously adjusting said members axially each at a different predetermined velocity for varying the equivalent focal length of the lens while maintaining the focal plane thereof fixed, an adjustable diaphragm associated with said lens, and automatic means for reducing the full range of adjustment of said lens members at the long focal length end thereof with adjustment of said diaphragm to a large aperture and permitting said full range of adjustment at smaller aperture adjustments of said diaphragm.

18. In a device of the character described the combination with a lense of variable equivalent focal length comprising a plurality of members, of means for simultaneously adjusting said members axially each at a different predetermined velocity for varying the equivalent focal length of the lens while maintaining the focal plane thereof fixed, an adjustable diaphragm associated with said lens, and automatic means for reducing progressively the full range of adjustment of said lens members at the long focal length end thereof with progressive adjustment of said diaphragm at large apertures and permitting said full range of adjustment at smaller aperture adjustments of said diaphragm.

19. In a device of the character described the combination with a lens of variable equivalent focal length comprising a plurality of members, of means for simultaneously adjusting said members axially each at a different predetermined velocity for varying the equivalent focal length of the lens while maintaining the focal plane thereof fixed, an adjustable diaphragm associated with said lens, means for selectively adjusting said diaphragm, means for automatically adjusting said diaphragm equivalently, with adjustment of said lens members, at different predetermined velocities dependent upon the selected adjustment of the diaphragm, and means under the control of said diaphragm adjusting means for reducing the full range of adjustment of said lens members at the long focal length thereof with adjustment of said diaphragm to a large aperture and permitting said full range of adjustment at smaller aperture adjustments of said diaphragm.

20. In a device of the character described the combination with a lens of variable equivalent focal length comprising a plurality of independently axially adjustable lens members, of an angularly movable annular member disposed on the axis of said lens for adjusting one of said lens members, a revoluble screw shaft arranged in parallelism with the axis of said lens for adjusting the remainder of said lens members, and an operative connection between said annular member and said screw shaft whereby said lens members are adjusted simultaneously.

21. In a device of the character described the combination with a lens of variable equivalent focal length comprising three independently axially adjustable lens members, of a forwardly disposed angularly movable tubular member disposed on the axis of said lens and provided with a drum cam groove for adjusting the forward lens member, a revoluble screw shaft arranged in parallelism with the axis of said lens and provided with two screwthreads of different pitches for simultaneously adjusting the middle and rear lens members at different velocities, and an operative connection between said tubular member and said screw shaft whereby all of said lens members are adjusted simultaneously.

22. In a device of the character described the combination with a lens of variable equivalent focal length comprising three independently axially adjustable lens members, of a forwardly disposed angularly movable tubular member disposed on the axis of said lens and within which the forward lens member moves and provided with an exterior drum cam groove for adjusting this forward lens member, a revoluble screw shaft arranged in parallelism with the axis of said lens and provided with two screwthreads of different pitches for simultaneously adjusting the middle and rear lens members at different velocities, an operative connection between said tubular member and said screw shaft whereby all of said lens members are adjusted simultaneously, and a multi-revolution hand crank operatively connected with said tubular member and screw shaft for actuating the same.

23. In a device of the character described the combination with a lens of variable equivalent focal length comprising a plurality of independently axially adjustable lens members, of means for simultaneously adjusting said lens members, adjustable stops for limiting adjustment of said lens members, and manually actuated means for actuating said adjusting means including a friction drive connection.

24. In a device of the character described the combination with a lens of variable equivalent focal length comprising a plurality of independently axially adjustable lens members, of means for simultaneously adjusting said lens members, an adjustable diaphragm associated with said lens, automatic means for reducing the full range of adjustment of said lens members at the long focal length end thereof with adjustment of said diaphragm to a large aperture and permitting said full range of adjustment at smaller aperture adjustments of said diaphragm, and adjustable stops for limiting adjustment of said lens members in both directions.

ARTHUR WARMISHAM.
IRVING CISSKI.